United States Patent
Gunna et al.

(10) Patent No.: US 10,622,687 B2
(45) Date of Patent: Apr. 14, 2020

(54) BATTERY PACK ENCLOSURE INCLUDING INTEGRATED FLUID CHANNEL

(71) Applicant: FORD GLOBAL TECHNOLOGIES, LLC, Dearborn, MI (US)

(72) Inventors: Rohit Gunna, Novi, MI (US); Kanchana Perumalla, Rochester Hills, MI (US); Neil Robert Burrows, White Lake Township, MI (US); Hyung Min Baek, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 628 days.

(21) Appl. No.: 14/821,986

(22) Filed: Aug. 10, 2015

(65) Prior Publication Data

US 2017/0047624 A1   Feb. 16, 2017

(51) Int. Cl.
*H01M 4/02* (2006.01)
*H01M 10/6556* (2014.01)
*H01M 10/625* (2014.01)
*H01M 2/10* (2006.01)

(52) U.S. Cl.
CPC ..... *H01M 10/6556* (2015.04); *H01M 2/1077* (2013.01); *H01M 10/625* (2015.04); *H01M 2220/20* (2013.01)

(58) Field of Classification Search
CPC ...................................................... H01M 4/02
See application file for complete search history.

(56) References Cited

U.S. PATENT DOCUMENTS

| | | | |
|---|---|---|---|
| 8,861,202 B2 | 10/2014 | Nassoiy | |
| 2008/0090107 A1* | 4/2008 | Scartozzi | H01M 8/04007 429/7 |
| 2009/0023056 A1 | 1/2009 | Adams et al. | |
| 2012/0263988 A1* | 10/2012 | Obasih | H01M 10/625 429/98 |
| 2013/0344376 A1* | 12/2013 | Asaida | H01M 2/1077 429/156 |
| 2014/0023894 A1 | 1/2014 | Jansen et al. | |
| 2014/0186669 A1 | 7/2014 | Obasih et al. | |
| 2014/0338995 A1 | 11/2014 | McLaughlin et al. | |
| 2015/0200429 A1* | 7/2015 | Lee | H01M 10/613 429/120 |
| 2015/0295221 A1* | 10/2015 | Urano | H01M 2/22 429/61 |

FOREIGN PATENT DOCUMENTS

| | | |
|---|---|---|
| EP | 2797137 A2 | 10/2014 |
| WO | 2013103254 A1 | 7/2013 |
| WO | 2014014407 A2 | 1/2014 |

* cited by examiner

*Primary Examiner* — Jacob B Marks
(74) *Attorney, Agent, or Firm* — David B. Kelley; Carlson, Gaskey & Olds

(57) ABSTRACT

A battery pack according to an exemplary aspect of the present disclosure includes, among other things, an enclosure including a monolithic body with at least a first sidewall and a base connected to the first sidewall and a fluid channel extending inside of at least one of the first sidewall and the base.

24 Claims, 6 Drawing Sheets

BATTERY PACK ENCLOSURE INCLUDING INTEGRATED FLUID CHANNEL

TECHNICAL FIELD

This disclosure relates to a battery pack for an electrified vehicle. The battery pack includes a monolithic enclosure body having at least a sidewall and a base. The sidewall, the base, or both include one or more fluid channels for thermally managing battery cells of the battery pack.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack for powering electric machines and other electrical loads typically includes multiple battery cells. An array structure binds the battery cells together. A separate enclosure houses and seals the battery cells from the exterior environment. Yet another separate structure, typically configured as a cold plate, is commonly positioned in contact with the battery cells to thermally manage the heat generated by the cells.

SUMMARY

A battery pack according to an exemplary aspect of the present disclosure includes, among other things, an enclosure including a monolithic body with at least a first sidewall and a base connected to the first sidewall and a fluid channel extending inside of at least one of the first sidewall and the base.

In a further non-limiting embodiment of the foregoing battery pack, the fluid channel is formed inside the base.

In a further non-limiting embodiment of either of the foregoing battery packs, the fluid channel is formed inside the first sidewall.

In a further non-limiting embodiment of any of the foregoing battery packs, the fluid channel is formed inside the base and a second fluid channel is formed inside the first sidewall.

In a further non-limiting embodiment of any of the foregoing battery packs, the monolithic body includes the first sidewall, the base, a second sidewall and a cover.

In a further non-limiting embodiment of any of the foregoing battery packs, the battery pack includes a plurality of fluid channels inside the monolithic body, the plurality of fluid channels connecting to establish a serpentine passage.

In a further non-limiting embodiment of any of the foregoing battery packs, the battery pack includes a plurality of fluid channels inside the monolithic body, the plurality of fluid channels arranged to establish a parallel, U-flow scheme.

In a further non-limiting embodiment of any of the foregoing battery packs, a first end cap is attached to a first end of the base and a second end cap is attached to a second end of the base.

In a further non-limiting embodiment of any of the foregoing battery packs, each of the first end cap and the second end cap include a manifold.

In a further non-limiting embodiment of any of the foregoing battery packs, both an inlet and an outlet are disposed in either the first end cap or the second end cap.

In a further non-limiting embodiment of any of the foregoing battery packs, a plurality of fluid channels are inside the monolithic body, and a plurality of walls are positioned to divide the plurality of fluid channels from one another.

In a further non-limiting embodiment of any of the foregoing battery packs, at least one of the plurality of walls extends from a first end of the base but terminates short of a second end of the base.

In a further non-limiting embodiment of any of the foregoing battery packs, an end plate or a cover is attached to the monolithic body.

In a further non-limiting embodiment of any of the foregoing battery packs, a plurality of ribs protrude from surfaces that surround the fluid channel.

In a further non-limiting embodiment of any of the foregoing battery packs, at least one battery array is positioned atop the base.

A method according to another exemplary aspect of the present disclosure includes, among other things, forming an enclosure for enclosing a battery array of a battery pack, the enclosure including a monolithic body that includes at least a first sidewall integrated with a base.

In a further non-limiting embodiment of the foregoing method, the forming step includes extruding the enclosure.

In a further non-limiting embodiment of either of the foregoing methods, the forming step includes manufacturing the enclosure such that at least one of the first sidewall and the base includes a fluid channel.

In a further non-limiting embodiment of any of the foregoing methods, the forming step includes manufacturing the enclosure to include the first sidewall, the base and at least one of a second sidewall or a cover.

In a further non-limiting embodiment of any of the foregoing methods, the method includes positioning the battery array atop the base. The base is configured to simultaneously support the battery array and thermally manage heat generated by battery cells of the battery array.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary battery pack designs for an electrified vehicle. The battery pack includes a monolithic enclosure body having at least a first sidewall that extends from a base. A fluid channel is formed inside the monolithic enclosure body and is configured to communicate a coolant. The coolant may be circulated through the fluid channel to thermally manage heat generated by battery cells of the battery pack. Fluid channels may be disposed through the base, the first sidewall and/or any other wall of the monolithic enclosure body. These and other features are discussed in greater detail in the following paragraphs of this detailed description.

Figure 1:
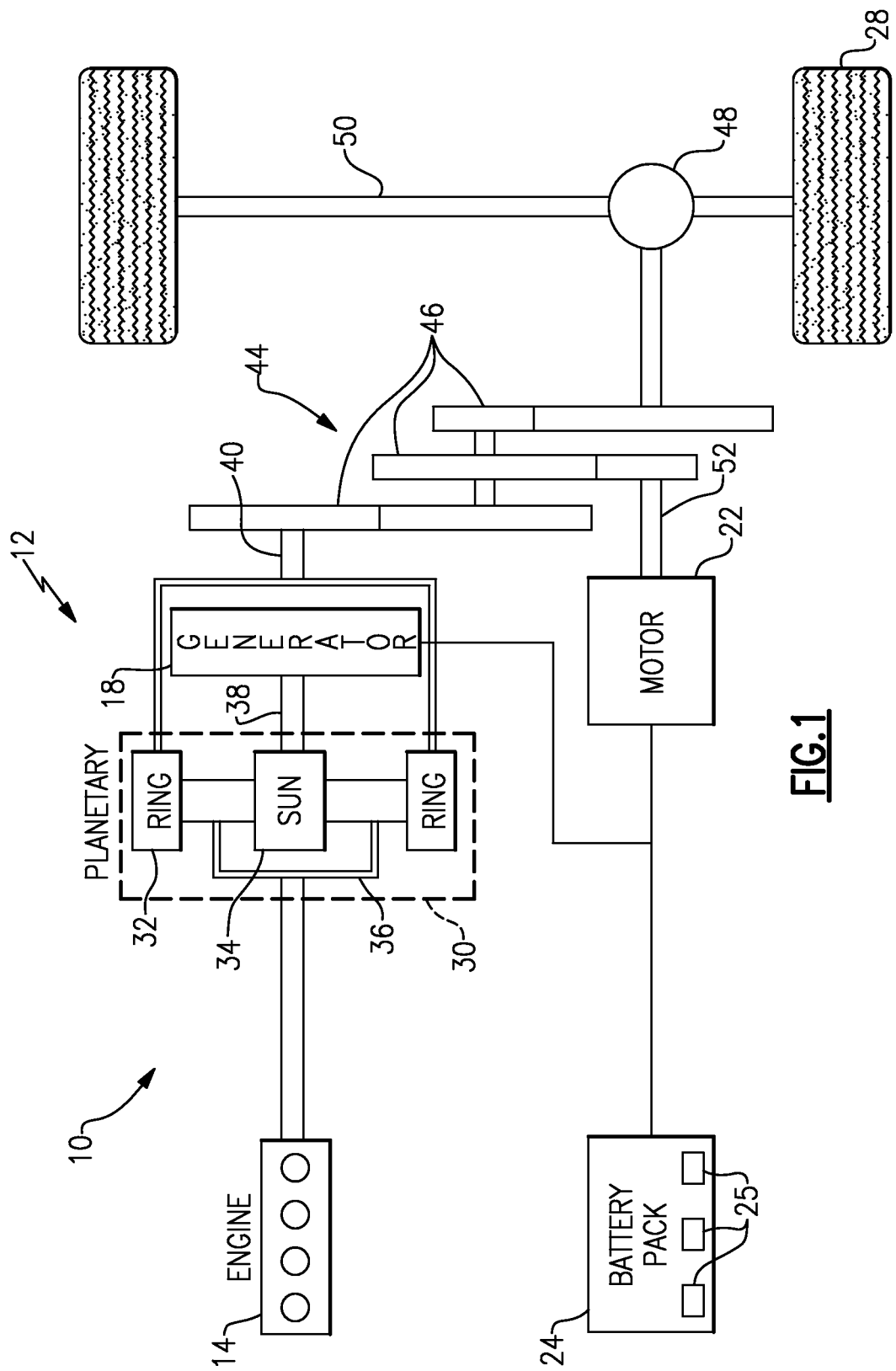
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
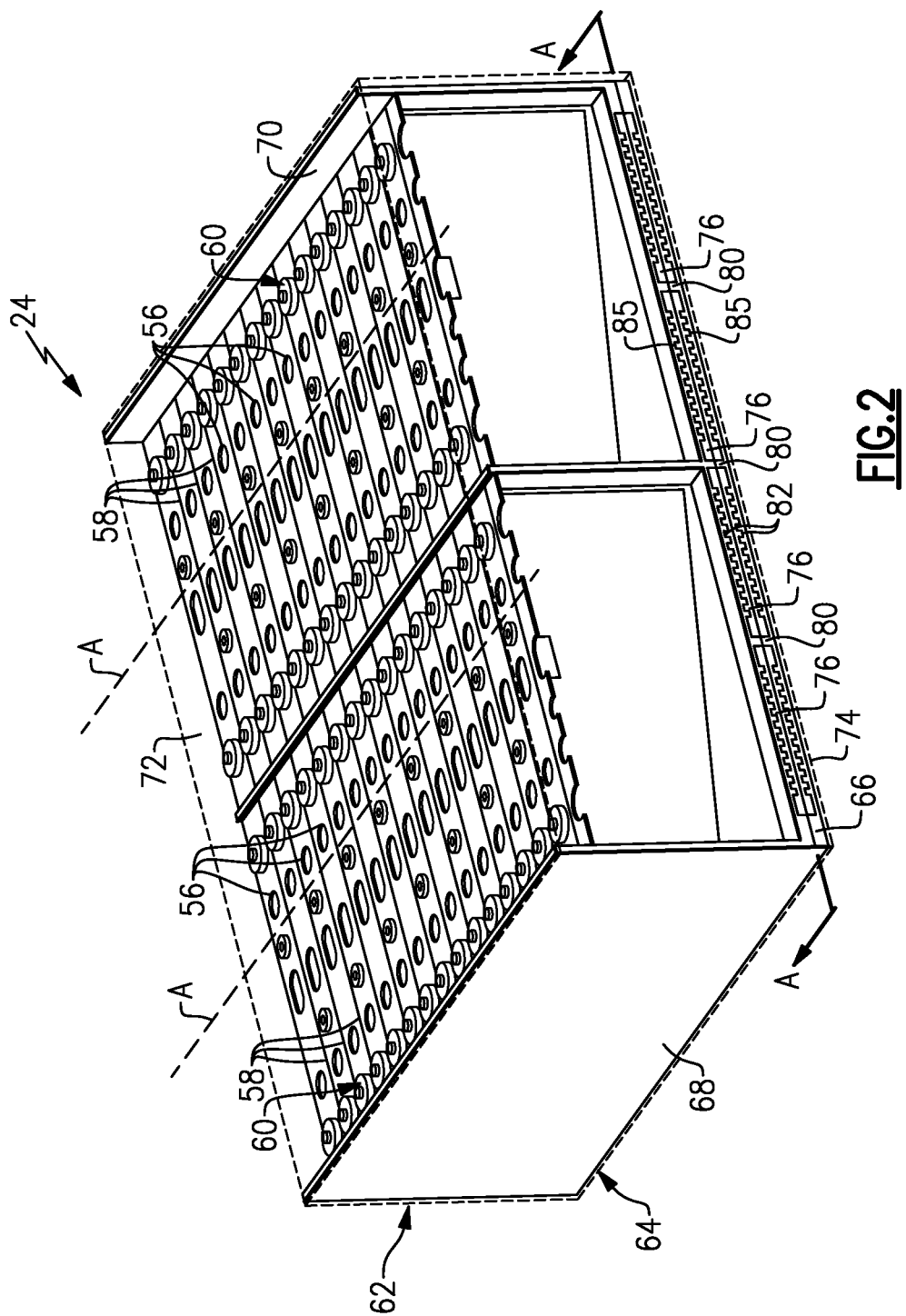
FIG. 2 illustrates portions of a battery pack of an electrified vehicle.

FIG. 2 illustrates portions of a battery pack 24 that can be employed within an electrified vehicle. For example, the battery pack 24 could be part of the electrified vehicle 12 of FIG. 1. The battery pack 24 includes a plurality of battery cells 56 for supplying electrical power to various electrical loads of the electrified vehicle 12. Although a specific number of battery cells 56 are depicted in FIG. 2, the battery pack 24 could employ a fewer or a greater number of battery cells within the scope of this disclosure. In other words, this disclosure is not limited to the specific configurations shown in FIGS. 2 and 3.

The battery cells 56 may be stacked side-by-side along a longitudinal axis A to construct a grouping of battery cells 56, sometimes referred to as a "cell stack." In one non-limiting embodiment, the battery pack 24 includes two separate groupings of battery cells 56 (i.e., two cell stacks).

In another non-limiting embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

In another non-limiting embodiment, spacers 58, which can alternatively be referred to as separators or dividers, may be positioned between adjacent battery cells 56 of each grouping of battery cells 56. The spacers 58 may include thermally resistant and electrically isolating plastics and/or foams. The battery cells 56 and the spacers 58 may together be referred to as a battery array 60. Two battery arrays 60 are shown in FIG. 2; however, the battery pack 24 could include only a single battery array or greater than two battery arrays. The battery cells 56 could be held together by a friction force generated as a result of compressing the cells during assembly of each battery array 60. In another embodiment, an adhesive is used to aid in holding the battery cells 56 together.

An enclosure 62 generally surrounds each battery array 60 of the battery pack 24. In one non-limiting embodiment, the enclosure 62 includes a monolithic body 64 that includes a base 66, a first sidewall 68 and a second sidewall 70. The first sidewall 68 and the second sidewall 70 are connected to the base 66 and, in one embodiment, extend upwardly at opposing sides of the base 66. The battery arrays 60 are positioned atop the base 66, and the first sidewall 68 and the second sidewall 70 extend adjacent to the sides of the battery arrays 60 along an axis that is parallel to the longitudinal axis A. In one non-limiting embodiment, the monolithic body 64 is an extruded, single-piece component with no mechanical connections.

The enclosure 62 may additionally include a cover 72 and end walls 74 (both shown in phantom to better illustrate other features of the battery pack 24) that may be attached to the monolithic body 64 to fully assembly the enclosure 62 and enclose the battery arrays 60. The cover 72 and the end walls 74 may be welded, bonded or mechanically fastened to the monolithic body 64. In another non-limiting embodiment, the enclosure 62 is made of aluminum, although other materials are also contemplated within the scope of this disclosure.

The enclosure 62 is configured to perform multiple functions. For example, in one embodiment, the enclosure 62 is configured to apply a compressive load against the battery arrays 60. In another embodiment, the enclosure 62 is configured to at least partially enclose and seal the battery arrays 60 from the exterior environment. In yet another embodiment, the enclosure 62, and more particularly the monolithic body 64 of the enclosure 62, is equipped with features for thermally managing the battery cells 56 of each battery array 60. For example, heat may be generated and released by the battery cells 56 during charging operations, discharging operations, extreme ambient conditions, or other conditions. It is often desirable to remove the heat from the battery pack 24 to improve capacity and life of the battery cells 56. In one non-limiting embodiment, the base 66 of the monolithic body 64 of the enclosure 62 acts as a cold plate, or heat exchanger plate, to conduct the heat out of the battery cells 56. In other words, the base 66 acts as a heat sink to remove heat from a heat source (i.e., the battery cells 56). Incorporating the cold plate functionality into the enclosure 62 in this manner can reduce the vertical footprint of the battery pack 24.

Figure 3:
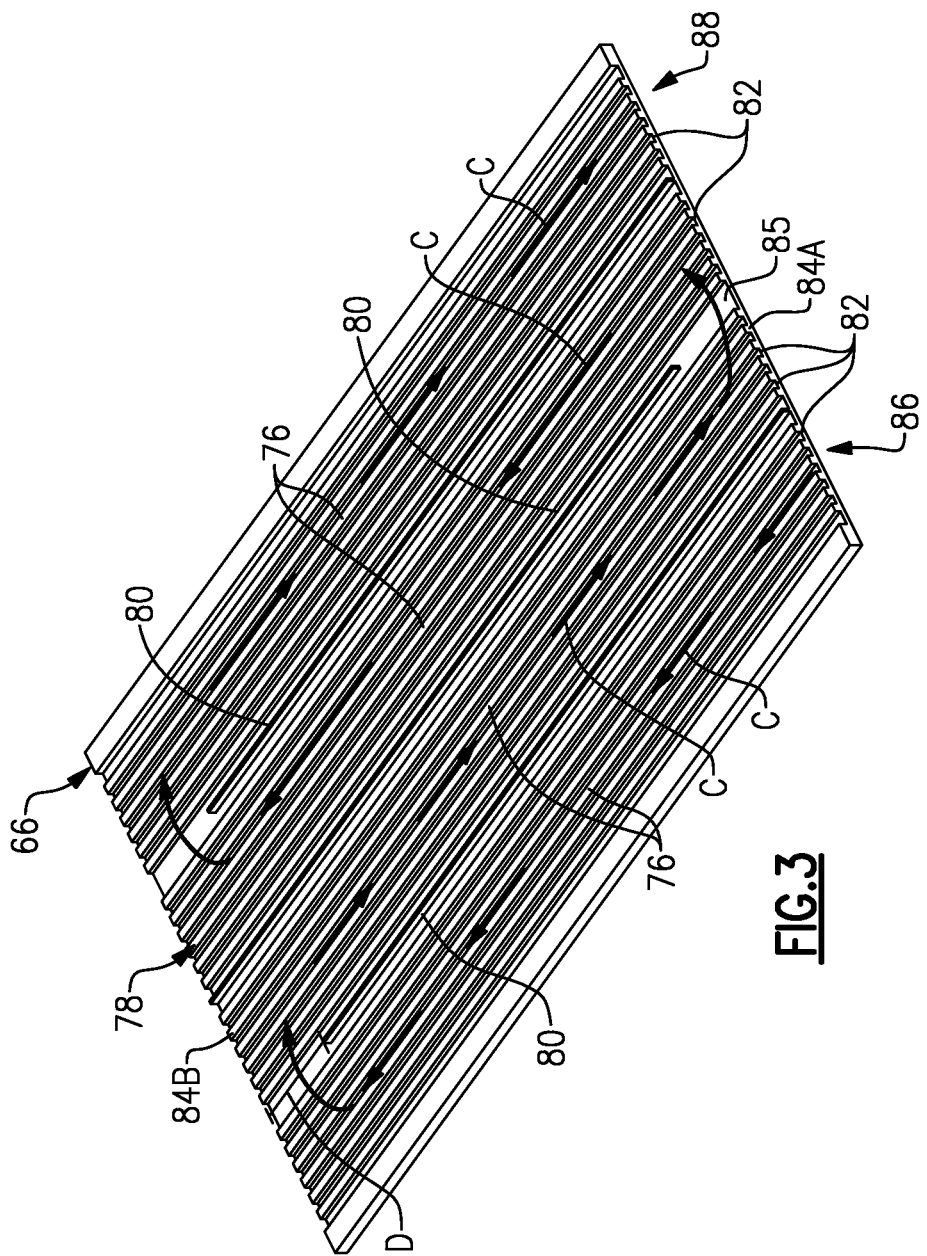
FIG. 3 is a cross-sectional view through section A-A of the battery pack of FIG. 2.

Referring now to FIGS. 2 and 3, the base 66 of the monolithic body 64 of the enclosure 62 may include one or more fluid channels 76 for circulating a coolant C to thermally condition the battery cells 56. The first sidewall 68, the second sidewall 70, or both may alternatively or additionally include similar fluid channels (see, for example, FIGS. 6 and 7). The coolant C may be a conventional type of coolant mixture such as water mixed with ethylene glycol. However, other coolants, including gases, are also contemplated within the scope of this disclosure.

In one non-limiting embodiment, the fluid channels 76 connect to establish a serpentine passage 78 for communicating the coolant C through the base 66. The serpentine passage 78 extends between an inlet 86 and an outlet 88. A plurality of walls 80 may separate the fluid channels 76 from one another. The walls 80 may extend between opposing ends 84A, 84B of the base 66. In one non-limiting embodiment, each wall 80 extends from one of the opposing ends 84A, 84B toward the other opposing end 84A, 84B but terminates prior to reaching the opposing end 84A, 84B. For example, the walls 80 may terminate by a distance D inwardly from the opposing end 84A, 84B. In this way, the flow of the coolant C is not blocked by the walls 80 and can turn from one fluid channel 76 to another as it travels along the serpentine passage 78. Portions of the walls 80 may be removed by trimming or machining to facilitate the continuous flow of the coolant C.

In yet another non-limiting embodiment, a plurality of ribs 82 protrude from surfaces 85 of the base 66 that circumscribe the fluid channels 76. The ribs 82 are configured to increase the surface area, and therefore the heat exchange capabilities, of the fluid channels 76.

The fluid channels 76 can be configured in different sizes and shapes to help meter and balance the flow of the coolant C through the serpentine passage 78. The size and shape of each fluid channel 76 and the total number of fluid channels 76 are not intended to limit this disclosure and can be specifically tuned to the cooling requirements of the battery pack 24.

In use, the coolant C is communicated into the inlet 86 of the serpentine passage 78 and is then communicated through the fluid channels 76 that define the serpentine passage 78 before exiting through the outlet 88. The coolant C picks up the heat conducted through the base 66 from the battery cells 56 as it meanders along its path. Although not shown, the coolant C exiting the outlet 88 may be delivered to a radiator or some other heat exchanging device, be cooled, and then returned to the inlet 86 in a closed loop.

Figure 4:
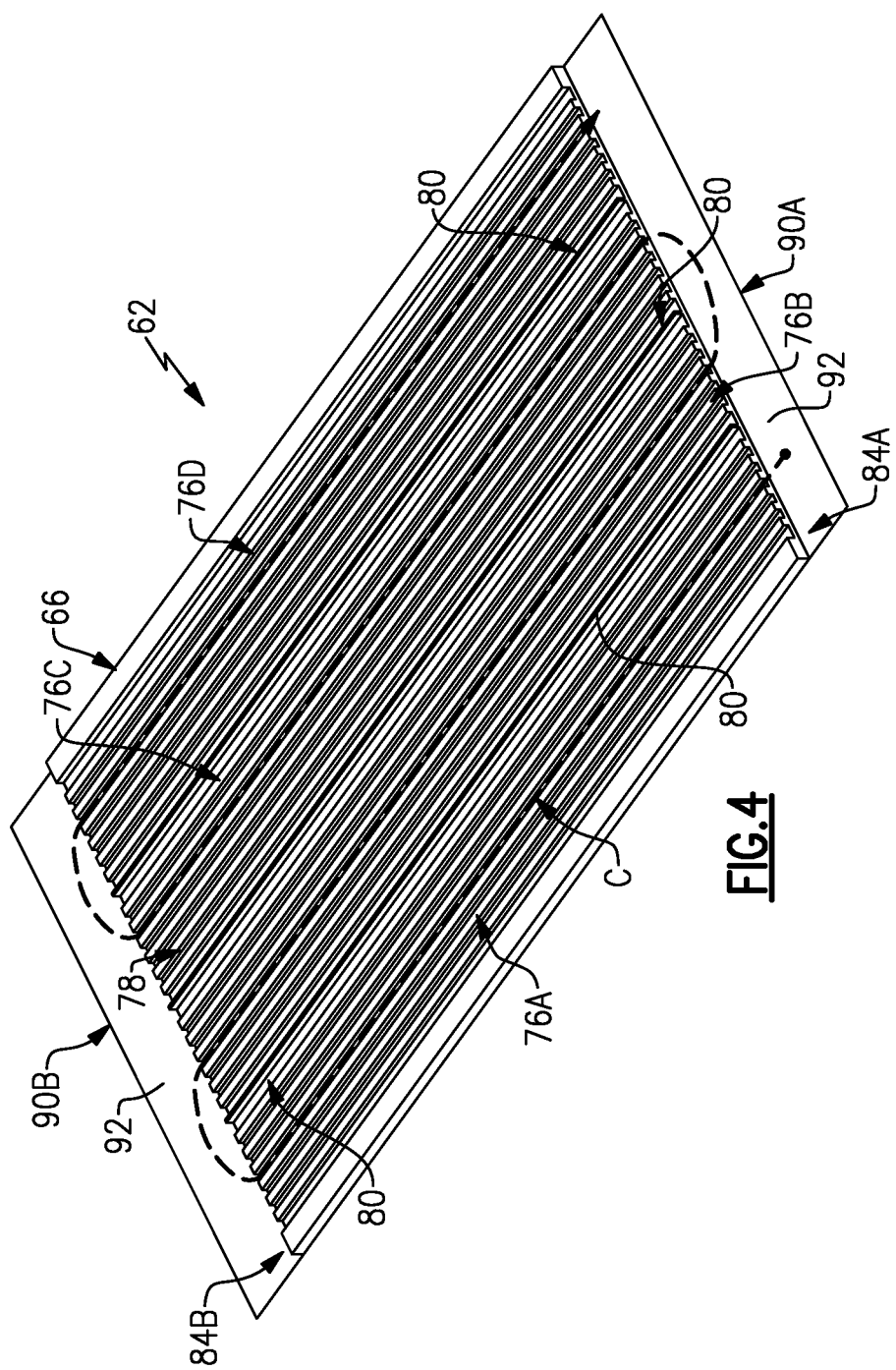
FIG. 4 illustrates an exemplary thermal management scheme of a battery pack enclosure.

FIG. 4 illustrates another exemplary thermal management scheme that may be incorporated inside the enclosure 62. In one non-limiting embodiment, the exemplary thermal management scheme is disposed inside the base 66 of the monolithic body 64 of the enclosure 62. However, the thermal management scheme could be disposed inside other portions of the enclosure 62.

In this embodiment, a first end cap 90A is attached at a first end 84A of the base 66 and a second end cap 90B is attached at a second end 84B of the base 66. The first end cap 90A and the second end cap 90B may be attached to the base in any known manner.

Each end cap 90A, 90B includes a manifold 92, or passage, for directing the coolant C through the serpentine passage 78. For example, coolant C from a first fluid channel 76A may be communicated into the manifold 92 of the second end cap 90B prior to entering a second fluid channel 76B. The coolant C may then be communicated through the second fluid channel 76B and into the manifold 92 of the first end cap 90A prior to entering a third fluid channel 76C and so on.

A plurality of walls 80 may separate the fluid channels 76A, 76B, 76C and 76D from one another in order to establish the serpentine passage 78. In one non-limiting embodiment, the walls 80 extend inside the base 66 and stretch from the first end 84A to the second end 84B. The manifolds 92 of the first end cap 90A and the second end cap 90B establish passages for allowing the coolant C to pass around each wall 80 as it is communicated along the serpentine passage 78.

Figure 5:
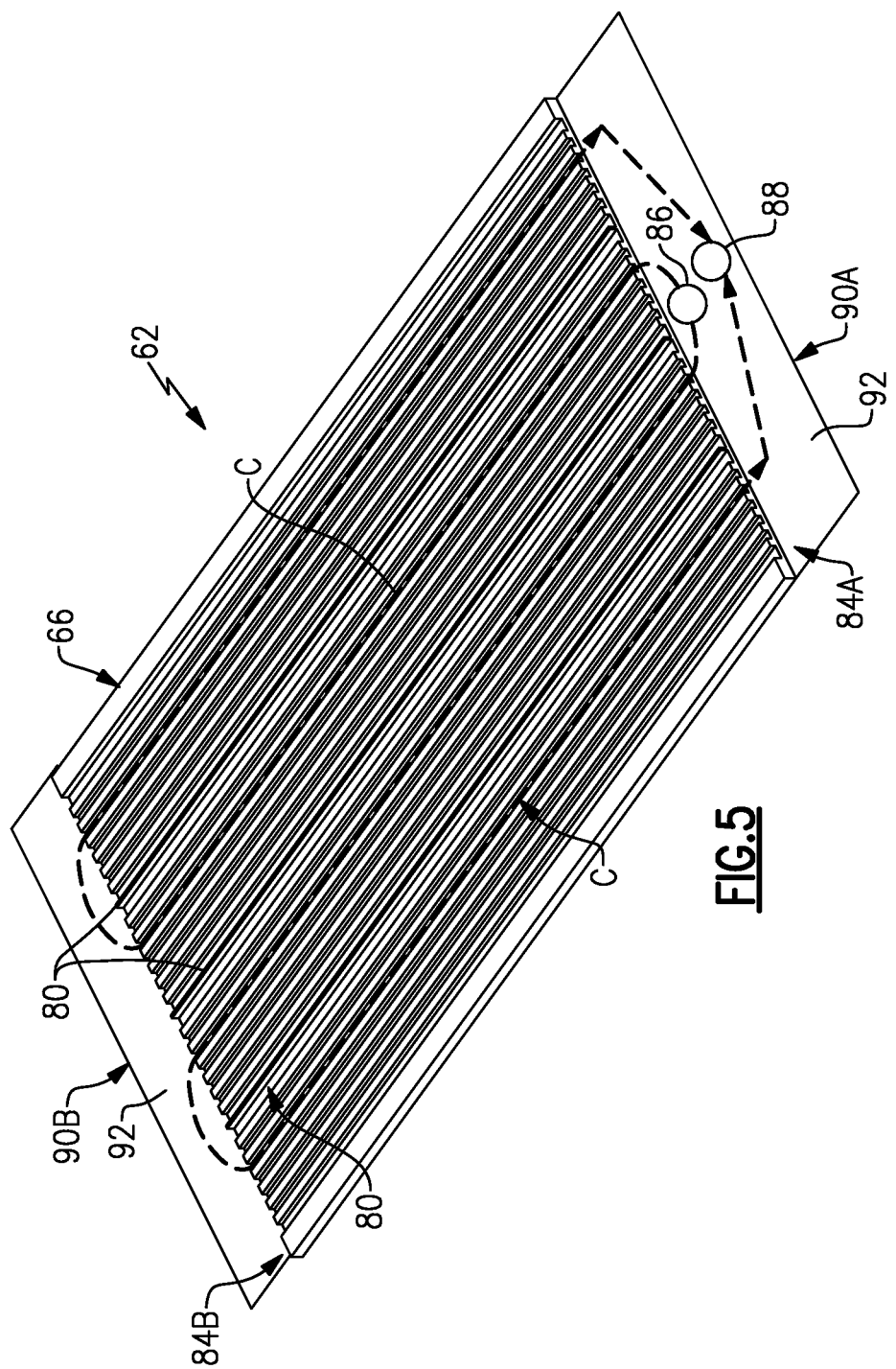
FIG. 5 illustrates another exemplary thermal management scheme of a battery pack enclosure.

FIG. 5 illustrates yet another exemplary thermal management scheme that may be incorporated into the enclosure 62. In this embodiment, the thermal management scheme provides a parallel, U-flow design for communicating the coolant C through the enclosure 62 so simultaneously cool two battery arrays (not shown in FIG. 5) in parallel. Similar to the FIG. 4 embodiment, a first end cap 90A is attached at a first end 84A of the base 66 and a second end cap 90B is attached at a second end 84B of the base 66. Each end cap 90A, 90B includes a manifold 92 for directing the coolant C into the parallel U-flow scheme. In one non-limiting embodiment, the first end cap 90A includes both an inlet 86 for directing the coolant C into the enclosure 62 and an outlet 88 for expelling the coolant C from the enclosure 62.

In operation, coolant C enters through the inlet 86 into the manifold 92 of the first end cap 90A. The coolant C may then simultaneously enter into both a first fluid channel 76A and a second fluid channel 76B inside the base 66. The coolant C is communicated across the lengths of the first and second fluid channels 76A, 76B prior to entering into the manifold 92 of the second end cap 90B. The coolant C may then turn around walls 80 and enter a third fluid channel 76C from the first fluid channel 76A and enter a fourth fluid channel 76D from the second fluid channel 76B. The portions of the coolant C that are communicated within the first and third fluid channels 76A, 76C and the second and fourth fluid channels 76B, 76D both travel along a U-shaped path. In this non-limiting embodiment, the coolant C communicated through the first and third fluid channels 76A, 76C may cool a first battery array and the coolant C communicated through the second and fourth fluid channels 76B, 76D may communicate a second battery array. The coolant C exiting the third and fourth fluid channels 76C, 76D may be expelled from the enclosure 62 through the outlet 88.

Figure 6:
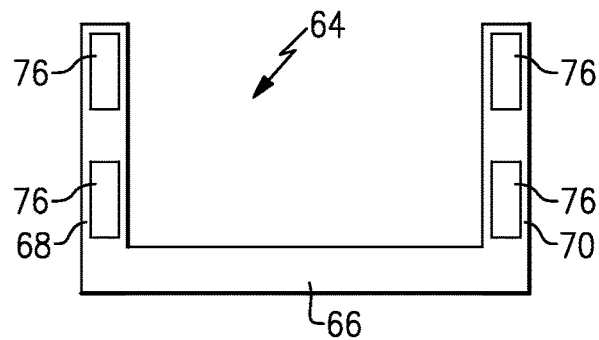
FIG. 6 illustrates an exemplary battery pack enclosure.
Figure 7:
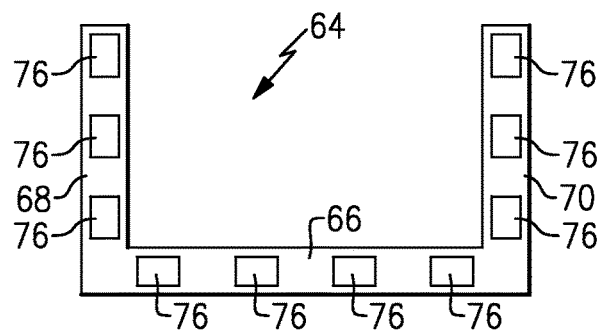
FIG. 7 illustrates a battery pack enclosure according to another embodiment of this disclosure.
Figure 8:
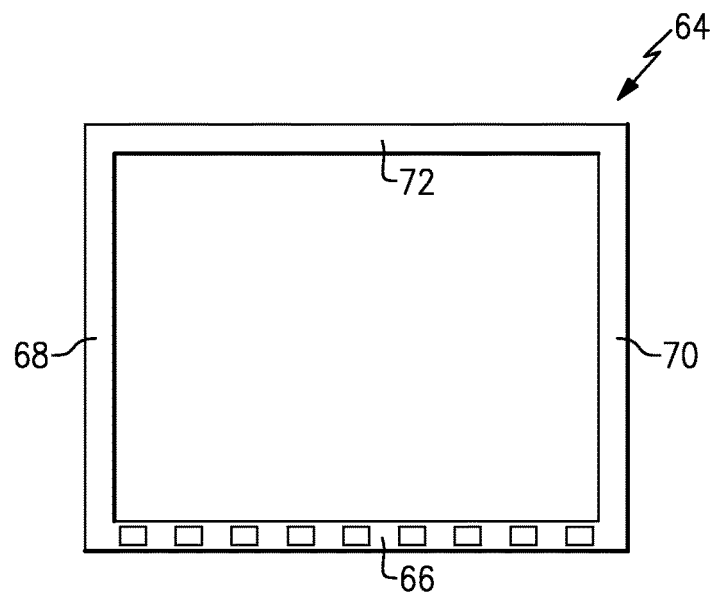
FIG. 8 illustrates a battery pack enclosure according to yet another embodiment of this disclosure.

FIGS. 6, 7 and 8 illustrate various alternative configurations of the monolithic body 64 of the enclosure 62 of the battery pack 24. Referring first to FIG. 6, the fluid channels 76 may be formed in one or both of the first and second sidewalls 68, 70 of the monolithic body 64 rather than in the base 66. Therefore, the first and second sidewalls 68, 70 can act as a cold plate instead of the base 66.

In another embodiment, shown in FIG. 7, fluid channels 76 may be formed through each of the base 66, the first sidewall 68 and the second sidewall 70 of the monolithic body 64. In this manner, thermal management of the battery arrays can be achieved at multiple locations of the monolithic body 64.

In yet another non-limiting embodiment, shown in FIG. 8, the monolithic body 64 of the enclosure 62 includes a base 66, a cover 72, a first sidewall 68 and a second sidewall 70. In other words, the base 66, the cover 72, the first sidewall 68 and the second sidewall 70 define a single-piece enclosure structure in which the first sidewall 68 and the second sidewall 70 connect, without any mechanical connections, between the base 66 and the cover 72.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   an enclosure including a monolithic body with at least a first sidewall and a base connected to said first sidewall, wherein said first sidewall and said base establish a single-piece structure with no mechanical attachments; and
   a fluid channel extending inside of at least one of said first sidewall and said base,
   wherein said fluid channel is formed inside said first sidewall.

2. The battery pack as recited in claim 1, wherein said fluid channel is formed inside said base.

3. The battery pack as recited in claim 1, wherein said monolithic body includes said first sidewall, said base, a second sidewall and a cover.

4. The battery pack as recited in claim 1, comprising a plurality of fluid channels inside said monolithic body, said plurality of fluid channels connecting to establish a serpentine passage.

5. The battery pack as recited in claim 1, comprising a plurality of fluid channels inside said monolithic body, said plurality of fluid channels arranged to establish a parallel, U-flow scheme.

6. The battery pack as recited in claim 1, comprising a first end cap attached to a first end of said base and a second end cap attached to a second end of said base.

7. The battery pack as recited in claim 6, wherein each of said first end cap and said second end cap include a manifold.

8. The battery pack as recited in claim 6, comprising both an inlet and an outlet disposed in either said first end cap or said second end cap.

9. The battery pack as recited in claim 1, comprising a plurality of fluid channels inside said monolithic body, and a plurality of walls are positioned to divide said plurality of fluid channels from one another.

10. The battery pack as recited in claim 9, wherein at least one of said plurality of walls extends from a first end of said base but terminates short of a second end of said base.

11. The battery pack as recited in claim 1, comprising an end plate or a cover attached to said monolithic body.

12. The battery pack as recited in claim 1, comprising a plurality of ribs that protrude from surfaces that surround said fluid channel.

13. The battery pack as recited in claim 1, comprising at least one battery array positioned atop said base.

14. The battery pack as recited in claim 1, wherein said monolithic structure is an extruded structure.

15. The battery pack as recited in claim 1, wherein said first sidewall, said base, a second sidewall, and a cover establish said single-piece structure with no mechanical attachments.

16. The battery pack as recited in claim 1, wherein said first sidewall, said base, and a second sidewall establish said single-piece structure with no mechanical attachments.

17. A battery pack, comprising:
- an enclosure including a monolithic body with at least a first sidewall and a base connected to said first sidewall, wherein said first sidewall and said base establish a single-piece structure with no mechanical attachments; and
- a fluid channel extending inside of at least one of said first sidewall and said base,
- wherein said fluid channel is formed inside said base and a second fluid channel is formed inside said first sidewall.

18. A method, comprising:
- forming an enclosure for enclosing a battery array of a battery pack, the enclosure including a monolithic body that includes at least a first sidewall integrated with a base to establish a single-piece structure with no mechanical attachments,
- wherein the enclosure is configured to apply a compressive load against the battery array, enclose and seal the battery array, and conduct heat out of a grouping of battery cells of the battery array.

19. The method as recited in claim 18, wherein the forming step includes extruding the enclosure.

20. The method as recited in claim 18, wherein the forming step includes manufacturing the enclosure such that at least one of the first sidewall and the base includes a fluid channel.

21. The method as recited in claim 18, wherein the forming step includes manufacturing the enclosure to include the first sidewall, the base and at least one of a second sidewall or a cover.

22. The method as recited in claim 18, comprising positioning the battery array atop the base, wherein the base is configured to simultaneously support the battery array and thermally manage heat generated by battery cells of the battery array.

23. A battery pack, comprising:
- an enclosure including a first sidewall, a second sidewall, and a base extending between said first sidewall and said second sidewall, wherein said first sidewall, said second sidewall, and said base establish a monolithic, single-piece structure with no mechanical attachments; and
- a fluid channel extending inside of at least one of said first sidewall, said second sidewall, and said base.

24. A battery pack, comprising:
- an enclosure including a first sidewall, a second sidewall, a base, and a cover that together establish a monolithic, single-piece structure with no mechanical attachments;
- a plurality of fluid channels extending inside each of the first sidewall, the second sidewall, and the base; and
- an end wall secured to the first and second sidewalls at each opposing side of the enclosure to enclose a battery array within the enclosure.

* * * * *